US010054116B2

(12) United States Patent
Brück et al.

(10) Patent No.: US 10,054,116 B2
(45) Date of Patent: Aug. 21, 2018

(54) PUMP FOR METERING A LIQUID ADDITIVE FOR A SELECTIVE CATALYTIC REDUCTION DEVICE

(71) Applicant: CONTINENTAL AUTOMOTIVE GMBH, Hannover (DE)

(72) Inventors: Rolf Brück, Bergisch Gladbach (DE); Jan Hodgson, Troisdorf (DE)

(73) Assignee: Continental Automotive GmbH, Hannover (DE)

( * ) Notice: Subject to any disclaimer, the term of this patent is extended or adjusted under 35 U.S.C. 154(b) by 318 days.

(21) Appl. No.: 14/772,698

(22) PCT Filed: Feb. 4, 2014

(86) PCT No.: PCT/EP2014/052140
§ 371 (c)(1),
(2) Date: Sep. 3, 2015

(87) PCT Pub. No.: WO2014/135325
PCT Pub. Date: Sep. 12, 2014

(65) Prior Publication Data
US 2016/0032914 A1  Feb. 4, 2016

(30) Foreign Application Priority Data

Mar. 5, 2013  (DE) .................. 10 2013 102 129

(51) Int. Cl.
*F04B 35/04* (2006.01)
*F04B 43/12* (2006.01)
(Continued)

(52) U.S. Cl.
CPC ............ *F04B 43/123* (2013.01); *F01C 21/08* (2013.01); *F01N 3/2066* (2013.01); *F04B 43/12* (2013.01);
(Continued)

(58) Field of Classification Search
CPC ........ F04B 43/123; F04B 43/12; F04B 43/14; F04C 2/30; F01C 21/08
See application file for complete search history.

(56) References Cited

U.S. PATENT DOCUMENTS 2,885,966 A * 5/1959 Ford .................. F04B 43/14
417/307
3,408,947 A * 11/1968 McMillan ............ F04B 43/14
418/45

(Continued)

FOREIGN PATENT DOCUMENTS

| CN | 2433415 | 6/2001 |
| CN | 101688645 | 3/2010 |

(Continued)

OTHER PUBLICATIONS

Office Action dated Aug. 22, 2016 which issued in the corresponding Japanese Patent Application No. 2015-560599.
(Continued)

*Primary Examiner* — Charles Freay
(74) *Attorney, Agent, or Firm* — Cozen O'Connor

(57) ABSTRACT

A pump for conveying a liquid, having a pump housing that has at least one inlet and at least one outlet, an eccentric element being rotatably arranged in said pump housing and surrounded by a deformable membrane, the deformable membrane and pump housing delimiting at least one conveyor path from the at least one inlet to the at least one outlet and forming at least one seal for the conveyor path, and the seal being able to be displaced along the conveyor path by a movement of the eccentric element. Between the eccentric element and the deformable membrane, a spring layer is arranged by the eccentric element and deformable membrane are tensioned relative to one another.

11 Claims, 4 Drawing Sheets

(51) Int. Cl.
*F01N 3/20* (2006.01)
*F04B 43/14* (2006.01)
*F04C 5/00* (2006.01)
*F01C 21/08* (2006.01)
*F04C 2/30* (2006.01)

(52) U.S. Cl.
CPC ............... *F04B 43/14* (2013.01); *F04C 2/30* (2013.01); *F04C 5/00* (2013.01); *F01N 2610/1433* (2013.01); *Y02A 50/2325* (2018.01); *Y02T 10/24* (2013.01)

(56) References Cited

U.S. PATENT DOCUMENTS

| | | | |
|---|---|---|---|
| 3,549,279 A | | 12/1970 | Grach |
| 3,597,123 A | * | 8/1971 | Lutz .................. F04B 43/14 417/415 |
| 4,332,534 A | * | 6/1982 | Becker ............... F04B 43/14 418/153 |
| 5,006,049 A | * | 4/1991 | von der Heyde ......... F04C 5/00 417/476 |
| 7,223,079 B2 | | 5/2007 | Ortega et al. |
| 2009/0301064 A1 | * | 12/2009 | Maier .................. F01N 3/2066 60/286 |
| 2010/0180479 A1 | | 7/2010 | Inaba et al. |

FOREIGN PATENT DOCUMENTS

| | | |
|---|---|---|
| DE | 12 09 429 | 1/1966 |
| DE | 697 24 938 | 7/2004 |
| DE | 10 2005 055013 | 3/2007 |
| DE | 10 2011 010644 | 8/2012 |
| EP | 0 886 729 | 12/1998 |
| GB | 768253 | 2/1957 |
| JP | 50-1922 | 1/1975 |
| JP | 56-143385 | 11/1981 |
| JP | 59-99084 | 6/1984 |
| JP | 64-56979 | 3/1989 |
| JP | 2007-500308 | 1/2007 |
| WO | WO 92/09805 | 6/1992 |
| WO | WO 97/34084 | 9/1997 |
| WO | WO 2012/126544 | 9/2012 |

OTHER PUBLICATIONS

Office Action dated Jan. 16, 2017 which issued in the corresponding Korean Patent Application No. 10-2015-7027197.

\* cited by examiner

Prior Art

PUMP FOR METERING A LIQUID ADDITIVE FOR A SELECTIVE CATALYTIC REDUCTION DEVICE

CROSS REFERENCE TO RELATED APPLICATIONS

This is a U.S. national stage of application No. PCT/EP2014/052140, filed on Feb. 4, 2014. Priority is claimed on German Application No. DE102013102129.8, filed Mar. 5, 2013, the content of which is incorporated herein by reference.

BACKGROUND OF THE INVENTION

1. Field of the Invention

The invention relates to a pump for delivering a liquid. The pump unit may be used in a motor vehicle to deliver a liquid additive to an exhaust-gas treatment device.

2. Detailed Description of Prior Art

In motor vehicles, widespread use is made of exhaust-gas treatment devices in which the exhaust gases of an internal combustion engine are purified with a liquid additive. An exhaust-gas purification method implemented in such exhaust-gas treatment devices is the method of selective catalytic reduction (SCR method). In this method, nitrogen oxide compounds in the exhaust gas are, with the aid of a reducing agent, reduced to form non-hazardous substances. Ammonia is commonly used as a reducing agent. It is often the case that ammonia is not supplied in a pure form to an exhaust-gas treatment device. Rather, a liquid additive is fed to the exhaust-gas treatment device, which liquid additive is, in the exhaust gas, converted to form ammonia. A liquid additive of said type is also referred to as reducing agent precursor solution. The conversion of the liquid additive in the exhaust-gas treatment device is performed thermally. based on the heat of the exhaust gases, and/or hydrolytically with assistance from a hydrolysis catalytic converter. A widely used liquid additive for the SCR method is a urea-water solution. A 32.5% urea-water solution is available under the trade name AdBlue®. The pump described here is suitable in particular for the delivery and supply of such liquid additive.

A pump for the delivery and supply of the liquid additive is commonly also capable of performing a dosing function. A dosing function means that the pump targetedly delivers and supplies a quantity of liquid additive predefined by a control unit. The accuracy with which the actually delivered quantity of liquid additive corresponds to the demanded quantity is crucial for successful exhaust-gas purification in the exhaust-gas treatment device. If too much liquid additive is supplied, ammonia can escape from the exhaust-gas treatment device. If too little liquid additive is supplied, the nitrogen oxide compounds in the exhaust gas are not fully converted. The pump should therefore permit the most accurate possible dosing. High dosing accuracy should also be attained in a manner independent of the aging of the pump over the entire service life of the pump.

In the case of pumps for the delivery and supply of the described liquid additives, it is furthermore a problem that the liquid additives can freeze. The urea-water solution described above, for example, freezes at −11° C. In motor vehicles, such low temperatures may arise during long standstill phases in winter. A volume expansion of the liquid additive occurs during the freezing process. Said volume expansion can lead to damage to or even destruction of the pump. The pump should therefore be designed to be capable of withstanding freezing, such that a volume expansion of the liquid additive can be accommodated without the pump being damaged or destroyed in the process.

SUMMARY OF THE INVENTION

It is an object of one embodiment of the present invention to solve or at least alleviate the technical problems highlighted in connection with the prior art. It is sought in particular to describe a particularly advantageous pump for delivering a liquid, which pump is firstly capable of withstanding freezing and furthermore exhibits high accuracy in the dosing of the liquid additive, wherein the influence of the aging of the pump on the accuracy of the dosing is low.

The features specified individually may be combined with one another in any desired technologically meaningful way and may be supplemented by explanatory facts from the description, with further design variants of the invention being specified.

The invention relates to a pump for the delivery of a liquid, having pump housing with at least one inlet and at least one outlet. In the pump housing there is rotatably arranged an eccentric surrounded by a deformable diaphragm, wherein the deformable diaphragm and the pump housing delimit at least one delivery path from the at least one inlet to the at least one outlet and form at least one seal of the delivery path. The seal is displaceable along the delivery path by way of a movement of the eccentric. Between the eccentric and the deformable diaphragm there is arranged a spring layer by which the eccentric and the deformable diaphragm are braced against one another.

The pump is in particular suitable for the delivery, and the simultaneous accurately dosed supply, of one of the liquid additives for exhaust-gas purification as described further above.

The pump housing is preferably shaped in the form of a flat cylinder or a flat ring. Here, the expression "flat" means in particular that the diameter of the pump housing is greater than the height of the pump housing. A shaft extends through the pump housing. The eccentric is fastened rotationally conjointly to the shaft. When the shaft is rotated, the eccentric rotates in the pump housing. The eccentric is thus rotatable relative to the pump housing. It is preferable for in each case precisely one inlet and one outlet to be provided. The inlet and the outlet are preferably arranged on a circumferential surface of the pump housing. Below, where reference is made to the circumferential surface and/or the face surfaces of the pump housing, these refer in each case to the respective inner surfaces (surfaces facing toward the interior of the pump housing) of the pump housing.

The deformable diaphragm preferably forms a ring-shaped element arranged around the eccentric and between the eccentric and the pump housing. The deformable diaphragm and the pump housing form a continuous fluid-tight delivery path that extends from the inlet to the outlet. The delivery path can be regarded as a ring-shaped duct between the wall of the housing and the deformable diaphragm. In this case, the expression "fluid-tight" means that the deformable diaphragm is sealed against a housing such that, aside from at the inlet and the outlet, no liquid can enter the delivery path. For this purpose, the deformable diaphragm preferably bears, in sections, in fluid-tight fashion against the housing. It is additionally possible for the deformable diaphragm to be connected, in sections, to the housing. The deformable diaphragm may also be adhesively bonded to the housing. The connection of the deformable diaphragm to the housing is in particular configured such that the delivery path, which is in the form of a ring-shaped duct, is not interrupted by the connection. The deformable diaphragm may for example be curved around a circumferential surface of the pump housing and adhesively bonded to the housing in an edge region of the deformable diaphragm. It is also possible for the deformable diaphragm to bear in fluid-tight fashion against two mutually opposite face surfaces of the housing.

The eccentric is preferably arranged such that the deformable diaphragm is deformed or flexed when the eccentric is rotated. The eccentric presses the deformable diaphragm against the housing, and in particular against a circumferential surface of the housing, at at least one location. In this way, the deformable diaphragm makes contact with the housing and in particular with the circumferential surface of the housing at said location, such that a seal is formed. The seal is fluid-tight and thus cannot be passed by the liquid in the delivery path. The delivery path is thus interrupted at the seal. During the rotation of the eccentric and the resulting deformation of the diaphragm, the seal is displaced. If the eccentric is rotated in a direction of rotation that corresponds to a delivery direction from the inlet to the outlet, the seal is displaced along the delivery path from the inlet to the outlet. In this way, the liquid is drawn from the inlet into the delivery path. At the same time, the liquid is forced out of the delivery path through the outlet.

A spring layer is situated between the deformable diaphragm and the eccentric. A spring layer refers in particular to a ring-shaped ply that separates the deformable diaphragm from the eccentric and which at the same time forms a contact between the eccentric and the deformable diaphragm. The statement that the spring layer is braced between the eccentric and the deformable diaphragm means in particular that the spring layer is compressed by the deformable diaphragm and the eccentric. The eccentric and the deformable diaphragm subject the spring layer to a compressive stress. The spring layer transmits a force exerted by the eccentric to the deformable diaphragm, such that, firstly, the delivery path from the inlet to the outlet is formed, and furthermore, the at least one seal of the delivery path is realized.

It is preferably the case that, during the rotation of the eccentric, the deformable diaphragm is likewise compressed at least in regions (in particular in the region of the seal). The deformable diaphragm and the spring layer thus together form a spring system between the housing and the eccentric, said spring system being compressed by flexing during the rotation of the eccentric.

The spring layer between the deformable diaphragm and the eccentric has the effect of reducing and/or homogenizing the forces acting on the deformable diaphragm. The forces acting on the deformable diaphragm are at their greatest in the region of the at least one seal, because the deformable diaphragm is pressed against the housing there. The force acting at the position of the seal is distributed uniformly by way of the spring layer.

As a special design variant of the spring layer, it is also possible for a bracing element for the deformable diaphragm to be provided on the eccentric itself. Said bracing element may also be integrated into the eccentric. The eccentric may for example have at least one resiliently mounted section that braces the deformable diaphragm. The at least one resiliently mounted section may for example be in the form of a cam mounted in displaceable fashion in a receptacle of the eccentric and which, for the bracing action, is pressed against the deformable diaphragm by a spring element. It is possible for multiple such receptacles, spring elements and cams to be arranged on the eccentric. Uniform bracing of the deformable diaphragm can be attained by way of a multiplicity of such receptacles, spring elements and cams.

The described pump permits highly accurate dosing of the liquid. Rotation of the eccentric results in delivery of the liquid. The delivered quantity of the liquid is dependent on the angle of rotation or rotational speed of the eccentric. In a particularly preferred design variant, there is even, at least in sections, a linear relationship between the angle of rotation and the delivered quantity. Here, the expression "in sections" means in particular that said linear relationship exists only in the region of certain positions of the at least one seal within the housing. For example, the linear relationship does not exist when the at least one seal passes over the inlet or the outlet of the pump.

A further advantage of the described pump is a high capability of withstanding a volume expansion of the liquid, such as may arise in the event of freezing. Owing to the high flexibility of the spring layer and of the deformable diaphragm, the pump can accommodate a volume expansion in the event of freezing, and is not damaged in the process.

The pump is furthermore advantageous if, between the outlet and the inlet, there is provided a seal that prevents a flow of the liquid additive from the outlet to the inlet counter to a delivery direction.

The (free-standing) seal may be realized for example by a local thickening or stiffening of the deformable diaphragm. It is also possible for the seal to be formed by a lug in the pump housing, which lug locally reduces the spacing between the eccentric and the pump housing at the location between the outlet and the inlet. By such a lug or such a thickening of the deformable diaphragm, it can be ensured that the deformable diaphragm always bears directly against the pump housing, and thus a fluid-tight, immovable seal between the pump housing and the deformable diaphragm is formed, at the position between the outlet and the inlet. Such a sealing means makes it possible for a backflow of liquid additive within the pump to be prevented. In this way, the effectiveness and the efficiency of the pump can be improved.

Furthermore, a pump is advantageous if the deformable diaphragm has a first spring constant in a radial direction proceeding from an axis of rotation of the eccentric, and the spring layer has a second spring constant in said radial direction, wherein the second spring constant is lower than the first spring constant.

The spring constant indicates the force required to compress the deformable diaphragm or the spring layer. The spring constant is in this case specified in newtons per square centimeter of diaphragm surface per centimeter of path length, wherein the path length denotes the path over which the deformable diaphragm or the spring layer is compressed. The force required to compress the spring layer is thus preferably smaller than the force required to compress the deformable diaphragm. This has the effect that the spring layer compensates for non-uniformities in the flexibility and/or the thickness of the deformable diaphragm. If the deformable diaphragm is for example manufactured with a non-uniform thickness, then the spring layer deforms between the deformable diaphragm and the eccentric such that the non-uniformities in the thickness of the deformable diaphragm are compensated. This lessens the stringency of the manufacturing tolerances that have to be adhered to during the manufacture of a described pump.

The described pump is furthermore advantageous if the deformable diaphragm is composed of a polymer material that can swell under the action of the liquid such that at least a thickness or a spring constant of the deformable diaphragm in the radial direction changes.

In particular if the liquid is liquid additive for exhaust-gas purification, the liquid will ingress into the deformable diaphragm and thereby change the thickness and the spring constant of the deformable diaphragm. This process takes a relatively long time, such that it occurs over the course of time, or the effect thereof becomes ever greater over the course of time, during the use of a described pump in a motor vehicle.

The spring layer is preferably designed so as not to undergo any change as a result of aging, or so as to undergo only a small change as a result of aging in relation to the deformable diaphragm. If the deformable diaphragm becomes thicker as a result of swelling, the spring layer will simply be further compressed in the regions in which the deformable diaphragm has become thicker. This is readily possible in particular if the spring constant of the spring layer is lower than the spring constant of the deformable diaphragm.

The diaphragm may also undergo change as a result of aging regardless of the delivered liquid. The deformable diaphragm is typically composed of a cross-linked polymer material. Such a material becomes increasingly cross-linked over the course of time, such that the rigidity of the deformable diaphragm increases. Such a change in the deformable diaphragm can likewise be compensated by the spring layer. If the spring constant of the deformable diaphragm decreases as a result of aging, then the deformation of the deformable diaphragm is simply replaced to an increasing extent by the deformability or the compressibility of the spring layer.

Furthermore, the pump is advantageous if, between the deformable diaphragm and the spring layer, there is arranged a sealing ply that prevents an ingress of the liquid from the deformable diaphragm into the spring layer.

Such a sealing ply may for example be formed by a fluid-tight insert situated between the spring layer and the deformable diaphragm. Said fluid-tight insert is preferably connected in fluid-tight fashion to the pump housing, such that it is also not possible for any liquid to ingress from the deformable diaphragm into the spring layer past the sealing ply. By a sealing ply, the spring layer can be protected from the liquid in an effective manner. This is advantageous in particular if the spring layer could also undergo aging and/or a change induced by the liquid.

Furthermore, the pump is advantageous if the spring layer comprises a multiplicity of spring elements which are braced between the deformable diaphragm and the eccentric.

The spring elements in the spring layer are oriented in a radial direction proceeding from an axis of rotation of the eccentric, to compress the deformable diaphragm from the direction of the eccentric in the direction of the pump housing. Each individual spring element has a spring constant. Said spring constants of the spring elements define the spring constant of the spring layer in the radial direction. The construction of the spring layer with a multiplicity of spring elements permits a particularly individual construction of the spring layer. For example, it is also possible for individual spring elements to be exchanged if they have aged. Furthermore, the spring constant of the spring layer may be increased or decreased in sections by the individual spring elements being selected correspondingly. It is thus also possible for different spring elements to be used within one pump.

Furthermore, the pump is advantageous if the spring layer comprises an elastic material braced between the deformable diaphragm and the eccentric. The elastic material can be compressed under the action of a force, and therefore has a spring constant.

The elastic material may for example be a nonwoven or a foam and may comprise a metallic material or a polymer material. If the elastic material is a foam, then the foam is preferably of open-pored form so that gas inclusions within the foam do not influence the compressibility of the foam. The elastic material makes it possible for the spring layer to be produced in a particularly simple and inexpensive manner.

The pump is furthermore advantageous if the eccentric has an outer bearing ring and an inner eccentric section, wherein, between the inner eccentric section and the outer bearing ring, there is arranged at least one bearing by which a rotational movement of the inner eccentric section can be converted into an eccentric wobbling movement of the outer bearing ring.

In this case, the inner eccentric section is fastened rotationally conjointly to a shaft of the pump. Said shaft is connected to a drive motor of the pump. The inner eccentric section is driven by way of the shaft. The outer bearing ring is preferably in contact with the spring layer. The bearing permits a transmission of the rotational movement of the eccentric section to the outer bearing ring. By virtue of the eccentric being split into an inner eccentric section and an outer bearing ring with a bearing arranged in between, it is possible to prevent shear forces such as would arise if the eccentric were directly rotatable and the rotational movement of the eccentric were to act directly on the spring layer or on the deformable diaphragm. In this way, the torque required for driving the eccentric is considerably reduced. The bearing may be a ball bearing or a roller bearing. A roller bearing is however preferred, because a roller bearing is particularly suitable for the transmission of force from the eccentric section to the outer bearing ring.

The invention is used in particular in a motor vehicle having an internal combustion engine, an exhaust-gas treatment device for the purification of the exhaust gases of the internal combustion engine, and a tank in which a liquid for exhaust-gas purification is stored, wherein the liquid can be delivered from the tank to the exhaust-gas treatment device by a described pump.

The liquid is preferably a liquid additive for exhaust-gas purification. In the exhaust-gas treatment device there is preferably provided an SCR catalytic converter in which nitrogen oxide compounds in the exhaust gas of the internal combustion engine can be reduced with the aid of the liquid additive to form non-hazardous substances. The tank and the exhaust-gas treatment device are preferably connected to one another by a line. The line issues into the exhaust-gas treatment device via an injector. The liquid can be dispensed into the exhaust-gas treatment device by the injector. The pump is arranged on the line such that the liquid additive can be drawn out of the tank by the pump and delivered via the line to the injector.

BRIEF DESCRIPTION OF THE DRAWINGS

The invention and the technical field will be explained in more detail below on the basis of the figures. The figures show preferred exemplary embodiments, to which the invention is however not restricted. In particular, it should be noted that the figures and in particular the illustrated proportions are merely schematic. In the figures.

Figure 1:
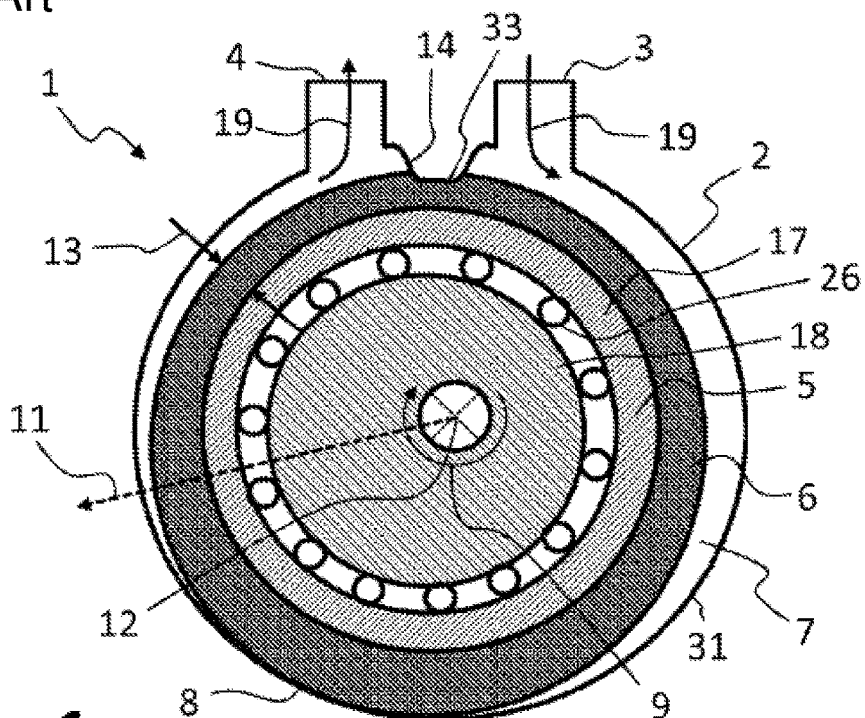
FIG. 1: is a pump of the prior art.

DETAILED DESCRIPTION OF THE
PRESENTLY PREFERRED EMBODIMENTS

Some of the features of a pump 1 illustrated in FIGS. 1 to 6 will firstly be explained jointly here. The pump 1 has a pump housing 2 with a circumferential surface 31. An inlet 3 and an outlet 4 enter the pump housing 2 through the circumferential surface 31. The pump housing 2 preferably furthermore has two face surfaces 30 that delimit the pump housing 2 in an axial direction. In the pump housing 2 there is arranged an eccentric 5 surrounded by a deformable diaphragm 6. Between the pump housing 2 and the eccentric 5, there is situated a delivery path 7 from the inlet 3 to the outlet 4. The liquid can pass through the delivery path 7 from the inlet 3 to the outlet 4, but the delivery path 7 is interrupted at a location at which a seal 8 is formed. The seal 8 is formed by virtue of the deformable diaphragm 6 bearing in fluid-tight fashion against the pump housing 2 or against a circumferential surface 31 of the pump housing 2. A rotation of the eccentric 5 about an axis of rotation 12 causes a deformation of the deformable diaphragm 6, and a displacement of the seal 8 along the delivery path 7 from the inlet 3 to the outlet 4. This gives rise to a delivery of liquid along a delivery direction 19 from the inlet 3 to the outlet 4. Between the outlet 4 and the inlet 3 there is provided a seal 14 which, together with the deformable diaphragm 6, forms an immovable seal 33 between the deformable diaphragm 6 and the pump housing 2, which seal is not displaced even during a rotational movement of the eccentric 5, and prevents a backflow of the liquid from the outlet 4 to the inlet 3. The deformable diaphragm 6 has a thickness 13 as viewed in a radial direction 11 proceeding from the axis of rotation 12 of the pump. During the rotation of the eccentric 5, said thickness 13 is changed in regions by virtue of the deformable diaphragm 6 being compressed.

This occurs for example in the region of the seal 8, where the deformable diaphragm 6 is pressed against the pump housing 2.

The eccentric 5 is preferably composed of an inner eccentric section 18, which is rotatable and connected to the shaft 25 of a drive motor 24 of the pump 1. The shaft 25 preferably lies on the axis of rotation 12. Furthermore, the eccentric 5 is preferably composed of an outer bearing ring 17 separated from the inner eccentric section 18 by the bearing 26. The bearing 26 serves to convert a rotational movement of the inner eccentric section 18 into an eccentric wobbling movement of the outer bearing ring 17. Said eccentric wobbling movement is transmitted to the deformable diaphragm 6 in order to displace the seal 8.

In the design variant of a pump 1 in FIG. 1, the deformable diaphragm 6 is applied to the eccentric 5 or to the outer bearing ring 17 of the eccentric 5. No spring layer is arranged between the deformable diaphragm 6 and the eccentric 5. The design variant of a pump as per FIG. 1 is therefore not the subject of the invention.

Figure 2:
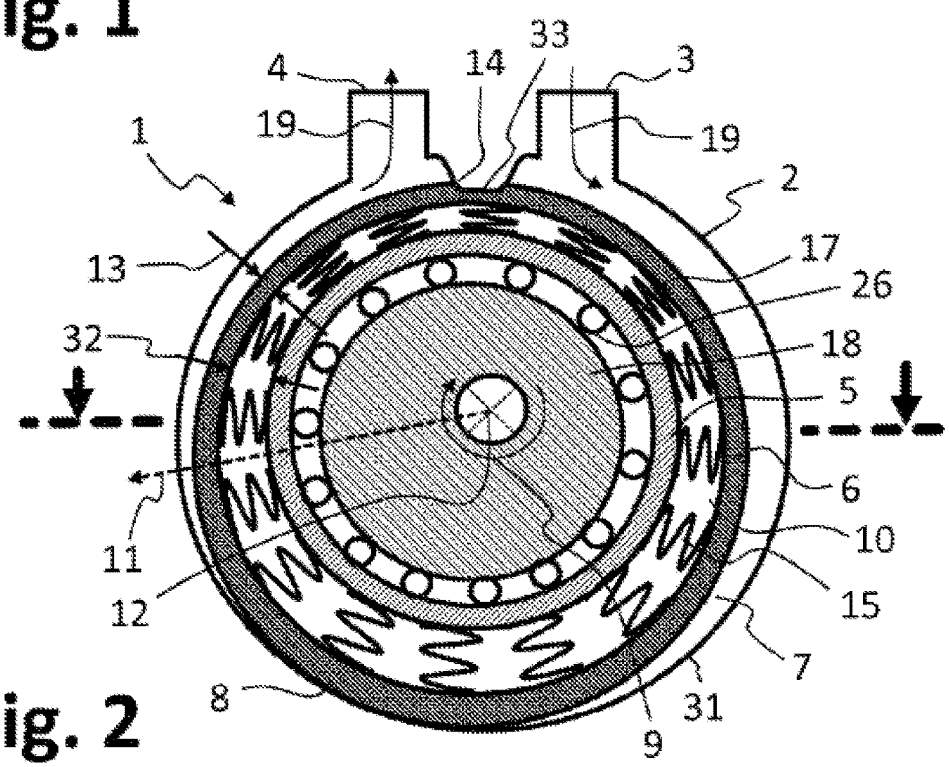
FIG. 2: is a design variant of the described pump.

According to one embodiment of the invention of the described pump 1, as per FIG. 2, a spring layer 10 is arranged between the eccentric 5, or the outer bearing ring 17 of the eccentric 5, and the deformable diaphragm 6. Said spring layer 10 is constructed from a plurality of spring elements 15 and has a spring layer thickness 32 in a radial direction 11.

Figure 3:
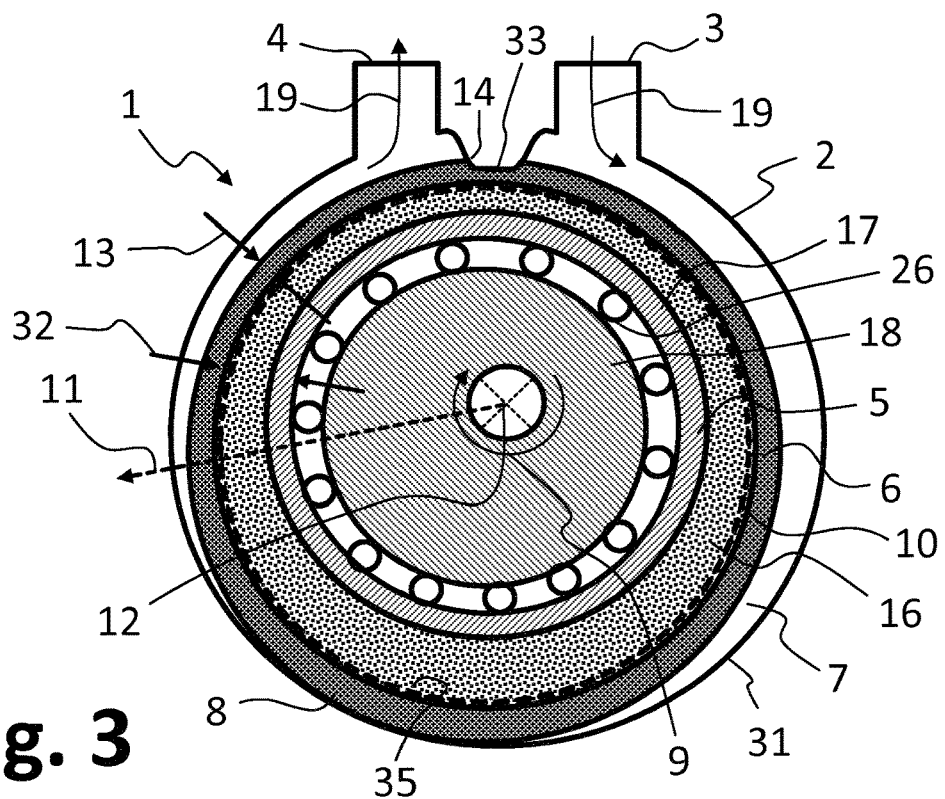
FIG. 3: is a further design variant of the described pump.

In the described pump 1 per FIG. 3, a spring layer 10 is likewise provided between the deformable diaphragm 6 and the eccentric 5. In this case, however, the spring layer 10 is formed from an elastic material 16 and is furthermore sealed off with respect to the deformable diaphragm 6 by way of a sealing ply 35 in order that no liquid can ingress into the spring layer 10 from the deformable diaphragm 6. Said spring layer 10 also has a spring layer thickness 32 in the radial direction 11.

Figure 4:
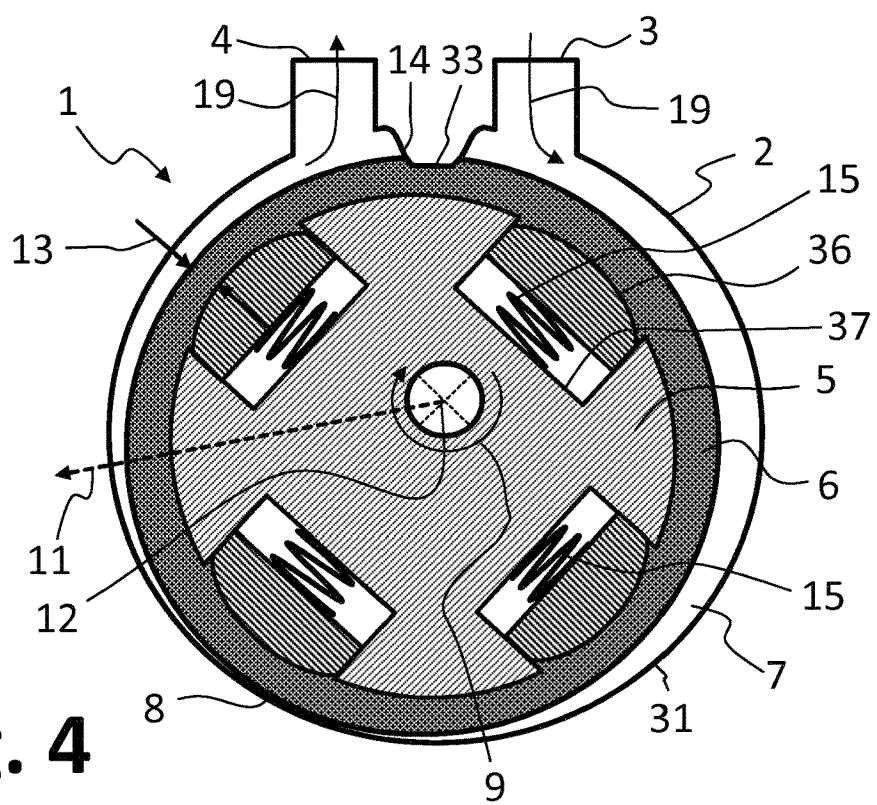
FIG. 4: is a yet further design variant of the described pump.

In the described pump 1 of FIG. 4, as a spring layer, spring elements 15 are formed on the eccentric 5 itself, which spring elements brace at least one section of the eccentric 5, said section being in the form of a cam 36, against the deformable diaphragm 6. The cam 36 and the spring element 15 are in each case arranged in a receptacle on the eccentric 5. The splitting of the eccentric 5 into an inner eccentric section 18 and an outer bearing ring 17 with a bearing 26 arranged in between is not illustrated in the design variant as per FIG. 4. Said features may however be added to the exemplary embodiment from FIG. 4.

Figure 5:
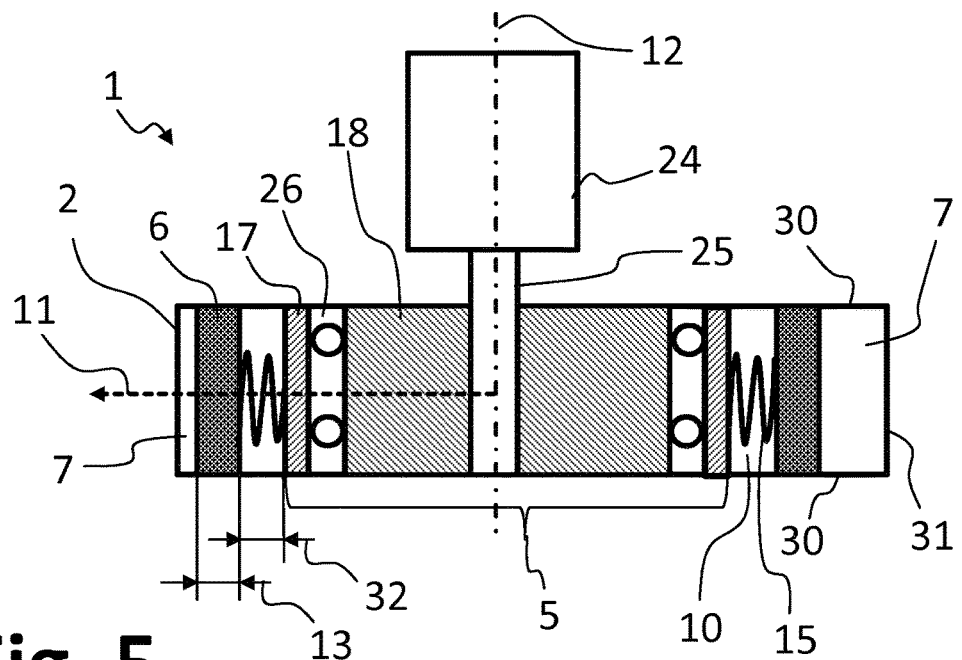
FIG. 5: is a section through a design variant of the described pump.

FIG. 5 shows, by way of example, the pump 1 illustrated in FIG. 2 in a sectional direction (see the arrows in FIG. 2). It can be seen that the delivery path 7 has different cross-sectional areas on the two sides of the pump 1 illustrated in FIG. 4. Said different cross-sectional areas of the delivery path 7 arise due to the eccentricity of the eccentric 5, which displaces the deformable diaphragm 6 within the pump housing 2 such that the cross section of the delivery path 7 varies regularly and a seal (not illustrated in FIG. 5) is displaced along the delivery path 7 from the inlet to the outlet. The deformable diaphragm 6 bears in fluid-tight fashion against the face surfaces 30 of the housing. FIG. 5 shows the shaft 25 with the drive motor 24, which drives the eccentric 5 of the pump 1.

Figure 6:
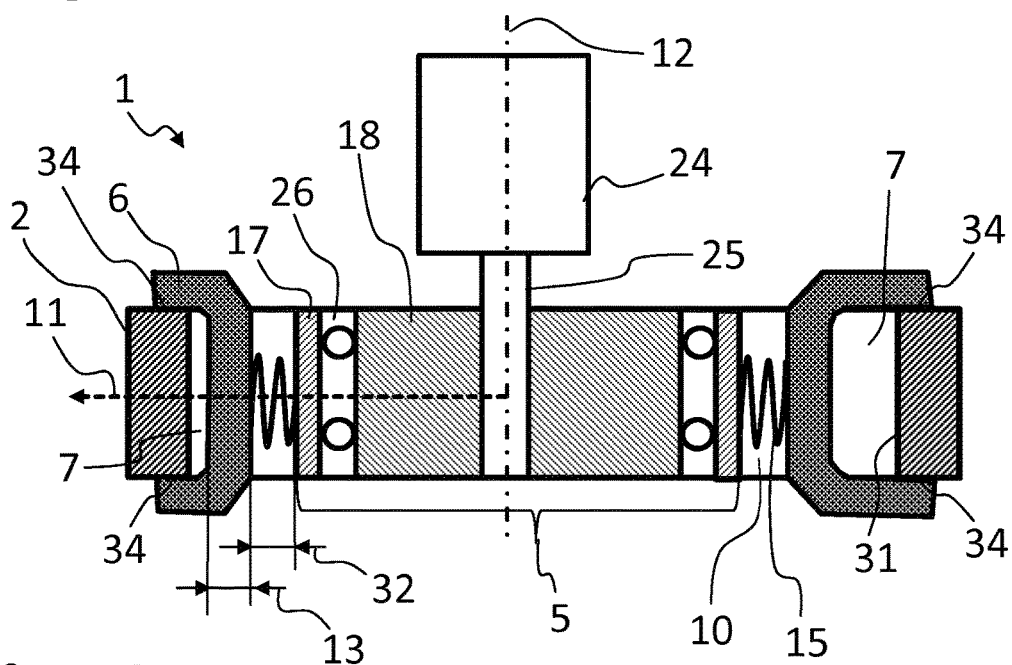
FIG. 6: is a section through a further design variant of the described pump.

FIG. 6 shows a sectional view, corresponding to FIG. 5, of a pump 1. In this case, the housing 2 is formed without face surfaces and has only a circumferential surface 31. The deformable diaphragm 6 is curved around the circumferential surface 31 of the housing 2 and is connected by way of its end regions 34 to the housing 2.

Thus, a particularly fluid-tight connection of the deformable diaphragm 6 to the housing 2 is made possible.

Figure 7:
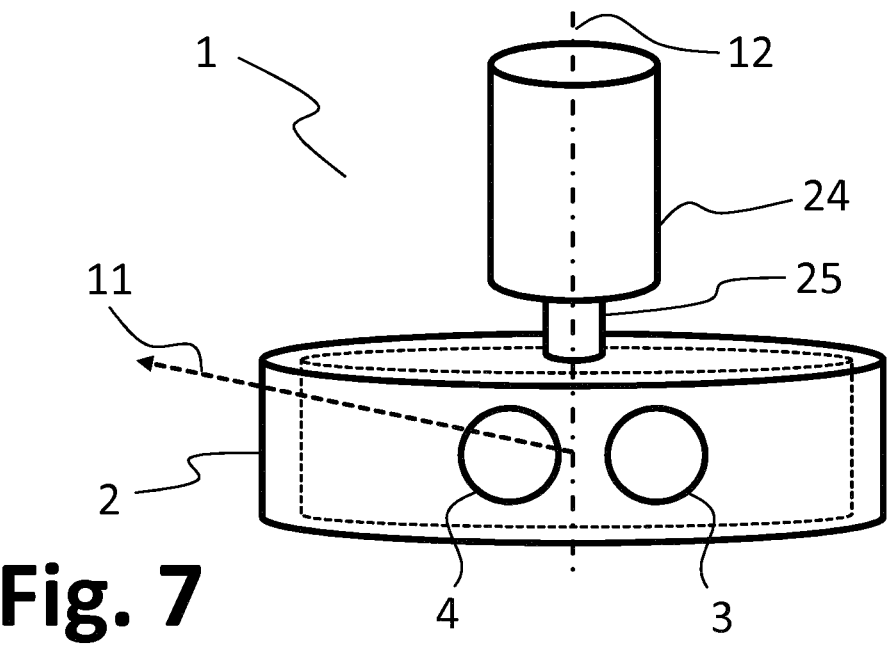
FIG. 7: is a simplified three-dimensional illustration of the described pump.

FIG. 7 shows a schematic illustration of a pump 1 having a pump housing 2 with inlet 3 and outlet 4 in an isometric view. The figure shows the axis of rotation 12 and the radial direction 11. The shaft 25 for driving the eccentric (not illustrated) within the pump housing 2, and the drive motor 24, are likewise illustrated.

Figure 8:
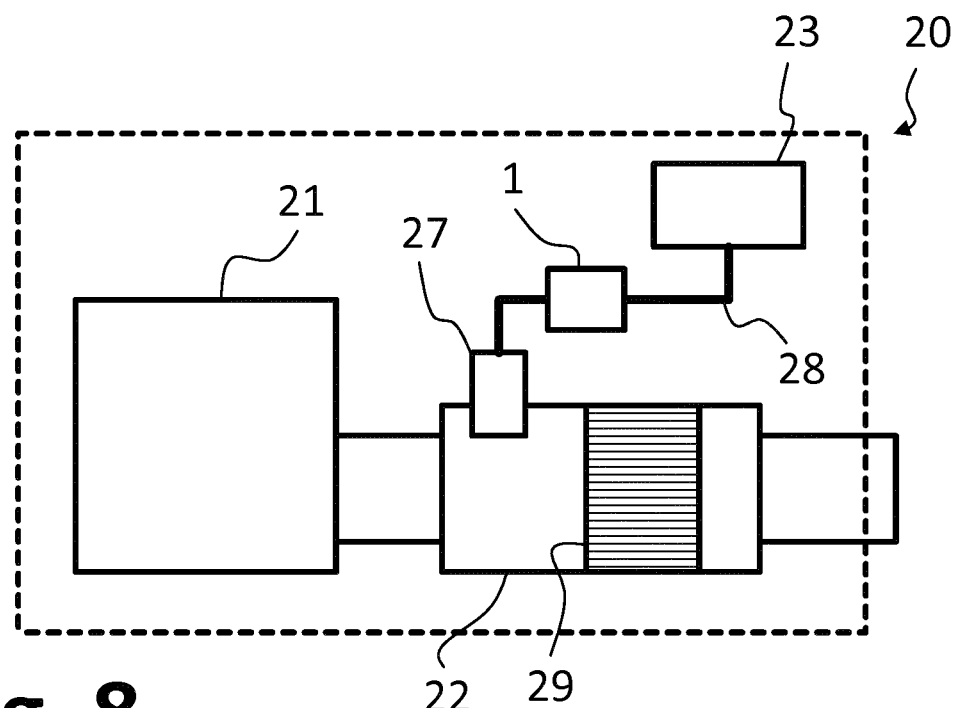
FIG. 8: shows a motor vehicle having a described pump.

FIG. 8 shows a motor vehicle 20, having an internal combustion engine 21 and an exhaust gas treatment device 22 for the purification of the exhaust gases of the internal combustion engine 21. The motor vehicle 20 furthermore has a tank 23 in which a liquid for exhaust-gas purification (in particular a urea-water solution) is stored. Said liquid can be delivered by a pump 1 to an injector 27 via a line 28. The liquid can be fed to the exhaust-gas treatment device 22 by means of the injector 27. In the exhaust-gas treatment device 22 there is provided an SCR catalytic converter 29 by which the method of selective catalytic reduction can be carried out in order to purify the exhaust gases of the internal combustion engine 21.

The described pump permits particularly accurately dosed delivery of liquid to an exhaust-gas treatment device in a motor vehicle. In this case, the pump undergoes only a very small change in the dosing quantity as a result of aging phenomena of the pump, and is furthermore capable of withstanding freezing.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A pump for delivering a liquid, comprising:
a pump housing having at least one inlet and at least one outlet;
an eccentric arranged rotatably in the pump housing;
a deformable diaphragm that surrounds the eccentric
at least one delivery path from the at least one inlet to the at least one outlet delimited by the deformable diaphragm and the pump housing;
at least one seal that is displaceable along the at least one delivery path by way of a movement of the eccentric; and
a circumferential spring layer arranged between the eccentric and the deformable diaphragm, the circumferential spring layer completely surrounding the eccentric and biases the deformable diaphragm away from the eccentric and having substantially a same axial width as the at least one delivery path.

2. The pump as claimed in claim 1, further comprising a seal arranged between the outlet and the inlet and configured to prevent a flow of the liquid from the outlet to the inlet counter to a delivery direction.

3. The pump as claimed in claim 1, wherein the deformable diaphragm has a first spring constant in a radial direction proceeding from an axis of rotation of the eccentric, and the spring layer has one or more second spring constants in the radial direction, wherein the second spring constants are each lower than the first spring constant.

4. The pump as claimed in claim 3, wherein the deformable diaphragm comprises a polymer material that swells due to the liquid such that at least one of a thickness and a spring constant of the deformable diaphragm in the radial direction changes.

5. The pump as claimed in claim 1, further comprising:
a sealing ply arranged between the deformable diaphragm and the spring layer that prevents an ingress of the liquid from the deformable diaphragm into the spring layer.

6. The pump as claimed in claim 1, wherein the spring layer comprises a plurality of spring elements arranged between the deformable diaphragm and the eccentric.

7. The pump as claimed in claim 1, wherein the spring layer comprises an elastic material arranged between the deformable diaphragm and the eccentric.

8. The pump as claimed in claim 1,
wherein the eccentric has an outer bearing ring and an inner eccentric section, and
wherein, at least one bearing is arranged between the inner eccentric section and the outer bearing ring and configured to convert a rotational movement of the inner eccentric section into an eccentric wobbling movement of the outer bearing ring.

9. The pump as claimed in claim 1, wherein the spring layer is braced between the eccentric and the deformable diaphragm and configured to compresses in the radial direction between the eccentric and the deformable diaphragm.

10. A motor vehicle comprising:
an internal combustion engine;
an exhaust-gas treatment device configured to purify exhaust gases of the internal combustion engine;
a tank in which a liquid for exhaust-gas purification is stored; and
a pump for delivering the liquid to the exhaust-gas treatment device, comprising:
a pump housing having at least one inlet and at least one outlet;
an eccentric arranged rotatably in the pump housing;
a deformable diaphragm that surrounds the eccentric
at least one delivery path from the at least one inlet to the at least one outlet delimited by the deformable diaphragm and the pump housing;
at least one seal that is displaceable along the at least one delivery path by way of a movement of the eccentric; and
a circumferential spring layer arranged between the eccentric and the deformable diaphragm, the circumferential spring layer completely surrounding the eccentric and biases the deformable diaphragm away from the eccentric and having substantially a same axial width as the at least one delivery path.

11. The motor vehicle as claimed in claim 10, wherein the spring layer is braced between the eccentric and the deformable diaphragm and configured to compresses in the radial direction between the eccentric and the deformable diaphragm.

* * * * *